Patented Aug. 7, 1945

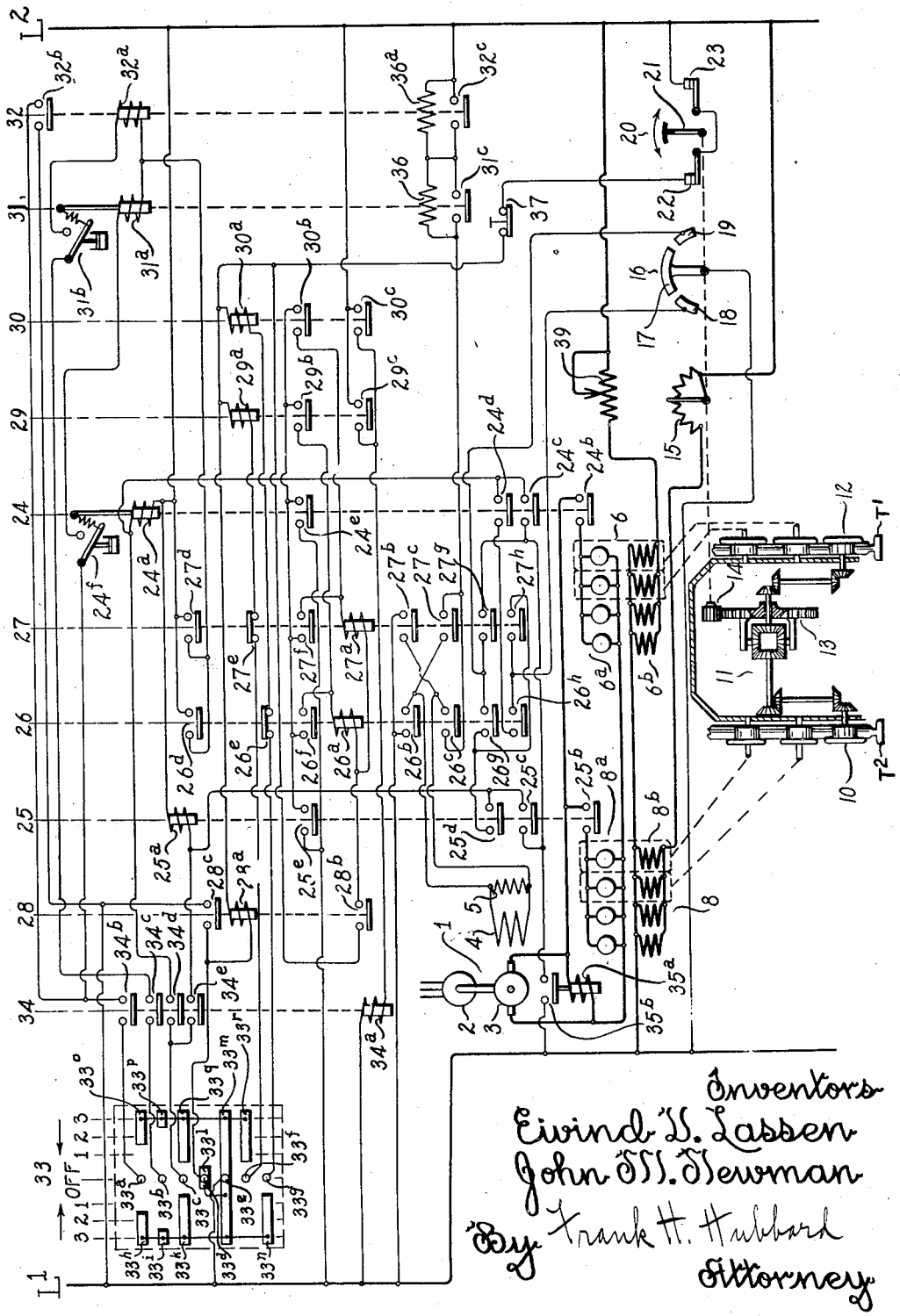

2,381,604

UNITED STATES PATENT OFFICE 2,381,604

MOTOR CONTROL SYSTEM

Eivind U. Lassen, Whitefish Bay, and John M. Newman, Wauwatosa, Wis., assignors to Cutler-Hammer, Inc., Milwaukee, Wis., a corporation of Delaware Application December 12, 1942, Serial No. 468,752

14 Claims. (Cl. 105—61)

The invention relates to a motor control system and more particularly to a system of control for a plurality of motors, connected to individual loads, which motors are installed at a considerable distance from each other but maintained in synchronism.

Traveling bridges such as traveling cranes or the like are provided at each end with a supporting truck which travels on a track. The wheels of each truck are driven by an electric motor or motors whose operation is controlled from a central point. Upon energization of the motors the wheels are rotated and move the trucks on the track in one direction or the other. It is necessary that the two ends of the bridge move always in unison, and since the load on the two ends of the bridge and the friction between the truck wheels and track may vary, the speed of the motors on the respective trucks and the travel of the two ends of the bridge tends to vary accordingly.

Heretofore various complicated systems for synchronizing the motors at the two ends of the bridge have been used, such as a mechanical tie between the several motors at each end of the bridge as well as between the two groups of motors at the two ends of the bridge. Such mechanical synchronization, however, is not a complete solution of the problem because it requires that all driving wheels be of the same diameter and that the slippage between wheels and track at both ends be the same. Since the wear of the truck wheels varies, such a system provides for synchronized motor speeds, but not for synchronization of the travel of the two bridge ends or equal tractive efforts of all of the wheels of each truck. The difference in travel between the two ends of the bridge produces skewing and binding of the bridge. The difference of diameter of the wheels produces slippage and friction and hence the entire bridge structure, the driving gears, and the shafting are subjected to severe strains resulting in considerable wear and requiring much maintenance. Furthermore, the power required for moving the bridge is increased by this binding and slippage.

The present invention eliminates mechanical synchronizing means such as tying shafts and gears between the individual driving wheels and/or the individual driving motors and between the trucks at the two ends of the bridge. Each driving wheel is driven by an individual shunt wound direct current motor and the armatures of the various motors are supplied with power from a variable voltage generator. The motors at the two ends of the bridge are caused to adjust their speeds in accordance with the actual wheel diameters.

However the degrees of travel of the two ends of the bridge are normally kept the same by regulating the speed of the respective motors or groups of motors in accordance with the relative positions of the two ends. As the two ends may nevertheless depart slightly relatively to each other due to inaccuracies in their response to a position responsive regulator, means are provided, whereby upon return to the neutral position of a controller which initiates the operation of the motors, the disconnection of the motors on the trailing end is delayed to afford correction. Should the departure be too great at any time, all the motors are disconnected.

An object of the invention is to provide a system for equalizing the travel of two mechanisms subject to variations in load and each driven by an individual motor by varying the relative speeds of the motors.

Another object is to provide for correction of differences in the travel of the two mechanisms of the aforementioned kind.

Another and more specific object is to provide, in a system comprising an individual motor or groups of motors for driving each end of a bridge, or the like, for equalizing the distance traveled by the two ends of the bridge.

Other objects and advantages will hereinafter appear.

The accompanying drawing is illustrative of an embodiment of the invention, which illustrates a system for operating traveling bridges or the like.

The power for moving the bridge along tracks at either end is supplied by a motor generator set 1, comprising an electric motor or other prime mover 2, coupled to the armature 3, of a variable voltage generator. The generator is provided with a regulating field winding 4, which is permanently shunted by a resistor 5. The field winding 4 is supplied with energy from a constant potential direct current source designated by the reference characters $L^1$, $L^2$, as will be explained hereinafter. By varying the excitation of the field winding the output voltage of the generator armature 3 may be varied. The generator armature supplies current to the armature $6^a$ and $8^a$ of the two groups of motors 6 and 8, respectively. The motors 6 are provided with shunt field windings $6^b$ and the motors 8 with shunt field windings $8^b$. The armatures as well as the shunt fields of each group of motors are permanently connected in parallel with each other. The bridge which is indicated by reference character B is supported at one end upon a track T' by a plurality of driving wheels each of which is coupled to one of the motors of group 6 and at its opposite end upon a track T² by a plurality of driving wheels, each of which is coupled to one of the motors of group 8. Only two of the driving wheels on each end of the bridge are illustrated and the driving connections between these wheels and their associated motors are illustrated by dotted lines. The individual driving wheels are not directly coupled or synchronized mechanically with each other in any manner except by their frictional engagement with the common tracks.

In addition to the driving wheels the trucks are provided with idler wheels 10 and 12, respectively, arranged to frictionally engage the tracks so as to rotate in proportion to the actual distance traveled by their associated trucks. Each idler wheel drives one of the two input shafts of a differential gear 11. The output gear 13 of said differential gear drives a pinion 14, which is provided with a shaft to which are coupled the contact lever of a variable rheostat 15, and a limit switch 16 having a movable arm provided with an elongated contact segment 17, which is adapted to engage stationary contact segments 18 and 19, respectively, if one of the two idler wheels 10 or 12, travels faster than the other. There is also mounted on the shaft of the pinion 14 another limit switch 20, having an arm 21, which is arranged to engage and thereby open normally closed limit switches 22 and 23, respectively, for stopping the equipment if the output gear of the differential, due to the skew of the bridge, is rotated to an extreme position in a clockwise or counterclockwise direction.

One terminal of all of the armatures 6a and 8a is permanently connected to one terminal of the armature 3. The connection of the other terminal of the armatures 6a to the second terminal of the generator armature 3 is controlled by the normally open contacts 24b of an electromagnetic switch 24, which in addition has an energizing winding 24a, normally open contacts 24c, 24d and 24e, and a time delay normally open contact 24f, whose closure upon response of the switch 24 is delayed by a dash pot or the like. The second terminal of the armatures 8a is connected to the second terminal of the generator armature 3 by the normally open contacts 25b of an electromagnetic switch 25, which is further provided with an energizing winding 25a and normally open contacts 25c, 25d and 25e.

The system further includes forward and reverse electromagnetic relays 26 and 27, respectively, having energizing windings 26a and 27a, respectively, normally open contacts 26b, 26c, 26d, 26f, 26g, 26h and 27b, 27c, 27d, 27f, 27g, 27h, respectively, and normally closed contacts 26e and 27e, respectively. There is also provided an undervoltage relay 28 having an energizing winding 28a, and normally open contacts 28b and 28c, electromagnetic relays 29 and 30, having energizing windings 29a and 30a, respectively, and normally open contacts 29b, 29c and 30b and 30c, respectively, a field control relay 31 having an energizing winding 31a and a normally open time delayed contact 31b. This contact is arranged in such a manner that when the armature of the relay is attracted it will tension a spring, which in turn tends to lift a movable contact to make circuit with a stationary contact. The response of the movable contact to the pull of the armature through the spring is delayed by a dash pot as indicated in the diagram. Any other time delay means may be substituted for those shown in the drawing. The relay 31 has also a normally open contact 31c. A second field control relay 32 is provided with an energizing winding 32a and normally open contacts 32b and 32c. The latter two relays are arranged to control the current strength of the field winding 4.

The operation of the system is initiated by a master controller 33 which is shown in the diagram as being of the drum type. The controller has a central neutral position and reverse operating positions on either side of the neutral position and is provided with stationary contact fingers 33a to 33g, inclusive, and with co-operating movable segments 33h to 33r, inclusive, all of which are connected together. Their co-operation will be explained hereinafter. There is further provided an electromagnetic relay 34 having an energizing winding 34a, and normally open contacts 34b to 34e, inclusive, and a generator voltage relay 35 having an energizing winding 35a connected across the armature 3 of the generator and normally open contacts 35b. For the control of the generator field strength the system includes resistors 36 and 36a, which are connected in series with the energizing field 4 of the generator. A conveniently located emergency push button switch 37 is connected in series with the contacts 22 and 23 of the limit switch 20 to permit stoppage of the equipment independent of the controller 33. A manual field rheostat 39 is provided in the common supply circuit of the motor field windings for adjusting the field current of both groups of motors jointly.

The circuit arrangement and operation of the system is as follows:

When it is desired to rotate the motor armatures 6a and 8a in one direction or the other the motor 2 is started and brought up to speed and the lines L¹ and L² are energized. When the lines are energized and the controller 33 is in its neutral position as shown in the diagram, a circuit is established from the line L¹ over contacts 33e, segment 33m to segment 33¹ to contact 33d, through the winding 28a, through a normally closed stop button 37, through the limit switches 22 and 23 to line L². The relay 28 thereupon attracts its armature and closes normally open contacts 28b and 28c. Closure of contact 28c establishes a maintaining circuit from the line L¹ through said contact, the energizing winding 28a and over the path traced heretofore to line L². Thus when the controller 33 is rotated from its neutral position the circuit between the contacts 33d and 33¹ is opened, but energization of the relay 28 is maintained. If now the controller 33 is rotated to the first forward operating position a circuit is established from the line L¹ to stationary contact 33e to movable contacts 33m, and 33r, stationary contact 33, through the normally closed contact 27e and the energizing coil 29a to the normally closed switch 37 and thence through the circuit traced heretofore to line L². This energizes the relay 29 and the latter closes its normally open contacts. With the contact 29c closed a circuit is established from line L¹ through relay coil 34a, contact 29c to line L². Thereupon the relay 34 is energized and will close its normally open contacts 34b to 34e, inclusive. A circuit is thereby established from line L¹ through contact 33e, to segment 33m, segment 33q, stationary contact 33c, through contacts 34d, energizing winding 24a to line L², and a parallel circuit is established from contact 33c, over contacts 34e, through coil 25a to line L². Electromagnetic switches 24 and 25 are thereupon energized to close their normally open contacts 24b and 25b respectively, thereby connecting the corresponding armatures 6a and 8a, across the armature 3. The shunt field windings 6b co-operating with the armatures 6a are energized by a circuit from line L¹ through the field winding 6b, through the adjustable resistor 39 to line L². The field windings 8b are energized by a circuit from line L¹ through the windings 8b, the variable resistor 15, to line L².

The energizing winding 26a of the relay 26 is energized by a circuit from line L¹ through contacts 24e, 29b, through the winding 26a, contact 28b, stop switch 37, limit switches 22 and 23, to line L². The contact 24e is paralleled by the contact 25, which is also closed. When the relay 26 is energized it closes its normally open contacts 26f, which parallels the contact 29b, so that now the relay 26 stays closed if the relay 29 is deenergized. When the relay 26 is energized it closes the contacts 26b and 26c, thereby establishing a circuit from the line L¹ through contact 26b, through the field winding 4 of the generator, through contacts 26c, the resistors 36 and 36a to line L². The generator is thus energized and generates an electromotive force which causes the motor armatures 6a and 8a to rotate. As the generator voltage increases the winding 35a of the voltage relay 35 causes the latter to close contact 35b and to establish maintaining circuits from line L¹ through contacts 24c and 25c, respectively, through the windings 25a and 24a to line L².

If now the controller 33 is moved to the second forward position a circuit is established from line L¹ through finger 33e, segment 33m, segment 33o, finger 33a, contact 34b, time delay contact 24f, the energizing winding 31a, through contacts 26d to line L². The energization of winding 31a closes the tact 31c, thereby short circuiting the resistor 36 and strengthening the current in the field winding 4.

If the controller 33 is moved to the third forward position a circuit is established between the segment 33p and the finger 33h, thereby completing a circuit from the line L¹ through the controller 33, contacts 34c, time delay contact 31b, energizing coil 32a, through contact 26d to line L². Energization of coil 32a causes closure of contact 32c, which short circuits the resistor 36a and that still further strengthens the current in the field winding 4. Relay 32 also closes contact 32b which establishes a maintaining circuit from line L¹ in parallel to the circuit through the controller 33 and contact 34b to maintain the energizing winding 31a independent of the former circuit as long as the switch 26 is energized.

If the controller 33 is operated in the reverse direction the relay 30 is energized instead of the relay 29, the circuits established being similar. Likewise the relay 27 is energized instead of the relay 26. This causes reversal of the current flow in the winding 4 thereby reversing the current supply to the armatures 6a and 8a.

As long as the two ends of the bridge travel at the same speed the gear 13 of the differential stands still and no change is made in the position of the contact arm of the resistor 15 or in the position of the levers 17 or 21. If, however, the end of the bridge driven by armatures 6a travels slower than the end driven by the armatures 8a, the gear 13 travels in such a direction as to move the contact of the resistor 15 in a counterclockwise direction thereby strengthening the fields 8a and causing the corresponding armatures to move slower so as to equalize the speeds of the two ends of the bridge. If the speed relation between the two ends of the bridge is reversed from that just described, the rheostat 15 is operated in the opposite direction, to increase the speed of the motors 8.

If the controller 33 is returned to the off position the relay 32 is deenergized thereby reducing the energizing current of the field winding 4. Thereafter the relay 31 is deenergized and drops out, thereby still further decreasing the generator voltage by decreasing its field energization. The relay 29 also drops out thereby deenergizing the winding 34a which causes the relay 34 to open all of its normally open contacts. However, the switches 24 and 25 are not deenergized until the contacts 35b of relay 35 respond to the decrease of the voltage of the generator armature 3. Thereupon the motor armatures 6a and 8a are disconnected from the generator and the bridge comes to a stand still.

If prior to the return of the drum controller to the off position the end of the bridge driven by the motors 8a should move ahead of the end driven by the motor armatures 6a in spite of the correction by the rheostat 15, the movable contact 17 of the limit switch 16 makes contact with the segment 18, thereby establishing a circuit from the line L¹ through segment 17, contact 18, contacts 26b, 24d, energizing coil 24a to line L². Thus the switches 24 and 26 are not deenergized when the voltage of the generator armature 3 is insufficient to keep the relay 35 in the attracted position, whereas the switch 25 opens the connection between the armatures 8a and the generator upon the relay 35 dropping out as the voltage of the generator dies down. The armatures 6a will thereby continue to be supplied with current and rotate until a correction is made in the relative position of the two ends of the bridge.

If the end of the bridge driven by the armatures 8a should lag behind the end driven by the armatures 6a, contact is established between the segment 16 and the contact 19 thereby establishing a similar maintaining circuit for the switches 25 and 27, so that the armatures 6a are disconnected and the armatures 8a are maintained energized until a correction is made in the relative position of the two ends of the bridge.

If the master controller is operated in the reverse direction from the one heretofore described, the action of the limit switch 16 is correspondingly modified as will be obvious, that is, that set of armatures which is driving the end of the bridge which lags in the direction in which the bridge is operated remains connected to the generator upon return of the master controller to the off position until the difference in relative position of the two legs has been rectified.

If the master controller 33 is thrown quickly from an operating position in one direction to an operating position in the other direction without stoppage, the various switches which are closed for the original direction of rotation are dropped out as heretofore described. For instance, in operating in a forward direction and throwing the master controller 33 to the direction for reversal all of the switches drop out as described until the switch 26 drops out whereupon switch 30 is energized through the normally closed contact 26e of switch 26 and the motors are accelerated in the reverse direction by functioning of the various switches as aforedescribed.

It should be pointed out that when the master controller is thrown from an operating position to the neutral position or to the reverse position, the motor armature switches 24 and 25 remain closed until the relay 35 opens its normally closed contacts whereby the circuit established from line L¹ through contacts 35ᵇ, 25ᶜ, winding 25ᵃ to line L², and from contact 35ᵇ through contact 24ᶜ, winding 24ᵃ to line L² are opened.

If with the master controller 33 in a running position one end of the bridge should continue to advance ahead of the other in spite of the correction by the rheostat 15, the contact arm 21 ultimately opens one of the limit switches 22 or 23, depending upon the relative displacement of the two ends of the bridge. This causes all of the control circuits to open and disconnects the motor armatures from the generator and deenergizes the generator, and no further movement of the bridge can take place until the position of the two ends of the bridge is rectified.

The adjustable resistor 39 is for the purpose of adjusting the speed of the motor armatures 6ᵃ, so that the movable contact of the resistor 15 remains normally in an intermediate position.

We claim:

1. A control system for a traveling bridge and the like comprising in combination with a pair of individual driving motors, one motor for each end of the bridge, for moving the bridge transversely in opposite directions, of means operable to simultaneously connect said motors to a supply of current and to jointly regulate their speed and direction of rotation and to also initiate disconnection of said motors from said supply, and means directly responsive to the relative transverse movement of the ends of the bridge for regulating the relative speeds of said motors, said means including separate means for each end of the bridge to measure the actual transverse movement thereof.

2. A control system for a traveling bridge and the like, comprising in combination with a pair of individual driving motors, one motor for each end of the bridge for moving the bridge transversely in opposite directions, of means operable to simultaneously connect said motors to a supply of current and to jointly regulate their speed and direction of rotation and to also initiate disconnection of said motors from said supply, means responsive to the relative transverse position of the ends of the bridge for regulating the relative speeds of said motors, and means responsive to variations of said relative position to delay disconnecting of the motor of the lagging end of the bridge from said supply upon initiation of disconnection of said motors from said supply by said first mentioned means.

3. A control system for a traveling bridge and the like, comprising in combination with a pair of individual driving motors, one motor for each end of the bridge for moving the bridge transversely in opposite directions, of a generator for supplying a variable and reversible voltage, means operable to simultaneously connect said motors to said generator, means responsive to the relative transverse position of the ends of the bridge for regulating the relative speeds of said motors, and means responsive to variations of said relative position and effective upon initiation of disconnection of said motors from said generator by said first mentioned means, to delay disconnection of the motor of the lagging end of the bridge.

4. A control system for a traveling bridge and the like, comprising in combination with a pair of individual driving motors, one motor for each end of the bridge for moving the bridge transversely in opposite directions and each motor having an armature and a field winding, of a variable voltage generator having an armature and a reversible regulating field winding, means to simultaneously connect said motor armatures to said generator armature, means to reverse the polarity and to vary the voltage of said generator to thereby vary the speed and reverse the direction of rotation of said motors jointly, means responsive to the relative transverse position of the ends of the bridge for regulating the field excitation of one of the motors relative to the field excitation of the other motor, and means responsive to variations of said relative position and effective upon initiation of disconnection of said motor armatures from said generator armature, to delay disconnection of the motor armature of the lagging end of the bridge from said generator armature.

5. A control system for a traveling bridge and the like, comprising in combination with a pair of individual driving motors, one motor for each end of the bridge for moving the bridge transversely in opposite directions and each motor having an armature and a field winding, of a variable voltage generator having an armature and a reversible separately excited field winding, electromagnetic means to connect said motor armatures to said generator armature, electromagnetic means to reversibly connect said generator field winding to a source of current, electromagentic means to regulate the current strength in said generator field winding, manual means operable to forward and reverse operating positions in opposite directions from a neutral position to jointly control the operation of said first, second and third electromagnetic means, and means responsive to variations of the relative transverse position of the ends of the bridge for regulating the field current of said motors relatively to each other and to control said first mentioned electromagnetic means to delay disconnection of the motor armature of the lagging end of the bridge from said generator armature upon operation of said manual means from an operating position to the neutral position.

6. A control system for a traveling bridge and the like, comprising in combination with a pair of individual driving motors, one motor for each end of the bridge for moving the bridge transversely in opposite directions and each motor having an armature and a field winding, of a variable voltage generator having an armature and a reversible separately excited field winding, electromagnetic means to connect said motor armatures to said generator armature, electromagnetic means to reversibly connect said generator field winding to a source of current, electromagnetic means to regulate the current strength in said generator field winding, manual means operable to forward and reverse operating positions in opposite directions from a neutral position to jointly control the operation of said first, second and third electromagnetic means, means responsive to variations of the relative transverse position of the ends of the bridge for regulating the field current of said motors relatively to each other and to control said first mentioned electromagnetic means to delay disconnection of the motor armature at the lagging end of the bridge from said generator armature upon operation of said manual means from an operating position to the neutral position and to stop said motors and prevent their further operation upon the difference of said relative transverse position becoming excessive.

7. A control system for a traveling bridge and the like having a stationary track at each end of the bridge and a driving wheel engaging said track and rotatably mounted on the bridge to move the bridge along said track in opposite directions selectively, comprising in combination with a motor for each driving wheel and each motor having an armature and a field winding, of a variable voltage generator having an armature and a reversible separately excited field winding, electromagnetic means to connect said motor armature to said generator armature, electromagnetic means to reversibly connect said generator field winding to a source of current, electromagnetic means to regulate the current strength in said generator field winding, manual means operable to forward and reverse operating positions in opposite directions from a neutral position to control the operation of said first, second and third electromagnetic means, an idler wheel for each end of the bridge for frictionally engaging said track to be rotated thereby upon movement of the bridge thereon, a differential having two input shafts, one each connected to one of said idler wheels to be driven thereby and an output shaft responding to the relative movement of said input shafts, a field rheostat driven by said output shaft and connected in circuit with the field on one of said motors and arranged to vary the field strength of said motor in response to said relative movement, and a limit switch connected in circuit with said first mentioned electromagnetic means and driven by said output shaft and adapted to delay disconnecting the motor armature at the lagging end of the bridge from said generator armature upon initiation of disconnection of said motor armatures by said manual means from said generator armature.

8. A control system for a traveling bridge and the like having a stationary track at each end of the bridge and a driving wheel engaging said track and rotatably mounted on the bridge to move the bridge along said track in opposite directions selectively, comprising in combination with a motor for each driving wheel and each having an armature and a field winding of a variable voltage generator having an armature and a reversible separately excited field winding, electromagnetic means to connect said motor armature to said generator armature, electromagnetic means to reversibly connect said generator field winding to a source of current, electromagnetic means to regulate the current strength in said generator field winding, manual means operable to forward and reverse operating positions in opposite directions from a neutral position to control the operation of said first, second and third electromagnetic means, an idler wheel for each end of the bridge for frictionally engaging said track to be rotated thereby upon movement of the bridge thereon, a differential having two input shafts, one each connected to one of said idler wheels to be driven thereby and an output shaft responding to the relative movement of said input shafts, a field rheostat driven to said output shaft and connected in circuit with the field of one of said motors and arranged to vary the field strength of said motor in response to said relative movement, a limit switch connected in circuit with said first mentioned electromagnetic means and driven by said output shaft and adapted to delay disconnecting the armature of the motor at the lagging end of the bridge from said generator armature upon initiation of disconnection of said motor armatures from said generator armature, and a second limit switch driven by the output shaft of said differential and adapted to disconnect said motor armatures from said generator armatures and prevent their further operation upon the difference of said relative transverse position becoming excessive.

9. A control system for a traveling bridge and the like, comprising the combination with a plurality of driving motors for each end of the bridge for selectively moving the bridge transversely in opposite directions, an individual motor for each traction wheel of the bridge, of a generator for supplying a variable reversible voltage, an individual electromagnetic switch for each plurality of motors to jointly connect the respective plurality of motors to said generator, electromagnetic means for reversing the voltage of said generator and regulating its magnitude, means responsive to the relative transverse position of the ends of the bridge for regulating the relative speeds of said motors and means responsive to said relative transverse position to selectively control said first named electromagnetic switches to delay disconnecting the plurality of motors of the lagging end of the bridge from said generator upon initiation of disconnection of said motors from said generator.

10. A control system for a traveling bridge and the like, comprising the combination with two pluralities of driving motors, one plurality of motors for each end of the bridge for moving the bridge transversely in opposite directions, and each motor for driving an individual traction wheel of the bridge, of a generator for supplying a variable reversible voltage, an individual electromagnetic switch for each plurality of motors to jointly connect the respective plurality of motors to said generator, electromagnetic means for reversing the voltage of said generator and regulating its magnitude, means responsive to the relative transverse position of the ends of the bridge for regulating the relative speeds of said pluralities of motors, means responsive to the voltage of said generator to control the energization of said electromagnetic switches, and means responsive to said relative transverse position for delaying response of the electromagnetic switch associated with the plurality of motors of the lagging end of the bridge to said voltage responsive means.

11. A control system for a traveling bridge and the like, comprising in combination with a pair of individual driving motors, one motor for each end of the bridge for moving the bridge transversely in opposite directions, of means to simultaneously connect said motors to a supply of current and to regulate their speed and direction of rotation and to disconnect said motors from said supply, said means including electromagnetic means responsive to the voltage of said generator, means responsive to the relative transverse position of the ends of the bridge for regulating the relative speeds of said motors, and means responsive to said relative transverse position to delay disconnecting the motor of the lagging end of the bridge from said supply uopn disconnection of the motor of the leading end in response to operation of said disconnecting means to disconnect said motors from said supply.

12. A control system for a traveling bridge and the like, comprising the combination with a pair of individual driving motors, one motor for each end of the bridge for moving the bridge transversely in opposite directions, of a source of electrical energy, means to vary the voltage of said source, and to reverse its polarity, means to simultaneously connect said motors to said source and to disconnect them therefrom jointly, and including electromagnetic means responsive to the voltage of said generator, means responsive to the relative transverse position of the ends of the bridge for regulating the speeds of said motors relative to each other, and means responsive to said relative transverse position to delay disconnecting the motor of the lagging end of the bridge from said source upon disconnection of the motor of the leading end in response to operation of said disconnecting means to disconnect said motors from said source.

13. A control system for a traveling bridge and the like having a stationary track at each end of the bridge and a plurality of driving wheels arranged at each end of the bridge engaging said track and rotatably mounted on the bridge to move the bridge along said track in opposite directions selectively, comprising in combination with an individual motor for each driving wheel, of a source of electrical energy, means to vary the voltage of said source and to reverse its polarity, means to simultaneously connect said motors to said source and to jointly disconnect them therefrom and including means responsive to the voltage thereof, an idler wheel for each end of the bridge for frictional engagement with said track to be rotated thereby upon movement of the bridge thereon, a differential having two input shafts, one each connected to one of said idler wheels and an output shaft responsive to the relative movement of said input shafts, speed regulating means driven by said output shaft and arranged to simultaneously vary the speed of the motors at one end of the bridge relative to the speed of the motors at the other end of he bridge in opposite directions, a limit switch connected in circuit with said first mentioned means and driven by said output shaft and adapted to delay disconnecting the motors at the lagging end of the bridge from said source of electrical energy prior to disconnecting the other motors upon initiation of operation of said disconnecting means to disconnect said motors from said source and a second limit switch driven by said output shaft and adapted to disconnect all of the motors from said source and prevent their further operation upon the difference of said relative transverse position becoming excessive.

14. A control system for a traveling bridge or the like, comprising the combination with a pair of driving motors for the opposite ends thereof, of a common control means for said motors for effecting simultaneous starting and stopping thereof, means responsive to overtravel of either end of the bridge with respect to the other for regulating the relative speed of said motors to effect squaring of the bridge, and means also responsive to overtravel of either end of the bridge with respect to the other to delay stopping of the motor associated with the lagging end of the bridge upon operation of said first mentioned means to effect stopping of said motors.

EIVIND U. LASSEN.
JOHN M. NEWMAN.